(12) United States Patent
Ma et al.

(10) Patent No.: US 8,936,210 B2
(45) Date of Patent: Jan. 20, 2015

(54) FLOATING DISPENSING MECHANISM FOR DRUM PACKED WELDING WIRE

(75) Inventors: Tiejun Ma, Tecumseh (CA); Jeffrey G. Wells, Belle River (CA); Romeo N. Cossette, Windsor (CA)

(73) Assignee: Illinois Tool Works Inc., Glenview, IL (US)

(*) Notice: Subject to any disclaimer, the term of this patent is extended or adjusted under 35 U.S.C. 154(b) by 577 days.

(21) Appl. No.: 13/297,595

(22) Filed: Nov. 16, 2011

(65) Prior Publication Data

US 2013/0119184 A1    May 16, 2013

(51) Int. Cl.
| | | |
|---|---|---|
| *B65H 59/06* | (2006.01) | |
| *B23K 9/133* | (2006.01) | |
| *B23K 9/173* | (2006.01) | |
| *B65H 57/20* | (2006.01) | |
| *B65H 49/08* | (2006.01) | |

(52) U.S. Cl.
CPC ............... *B23K 9/1333* (2013.01); *B23K 9/173* (2013.01); *B65H 57/20* (2013.01); *B65H 49/08* (2013.01); *B65H 2701/36* (2013.01)
USPC ...................... 242/423.1; 242/128; 242/156.1

(58) Field of Classification Search
CPC ........ B65H 49/02; B65H 49/08; B65H 57/18; B65H 59/06; B23K 9/1333; B65D 85/04
USPC ........ 242/156, 156.1, 156.2, 423.1, 566, 593, 242/128, 125.3, 172, 419, 157 R
See application file for complete search history.

(56) References Cited

U.S. PATENT DOCUMENTS

| | | | | |
|---|---|---|---|---|
| 3,815,844 | A | * | 6/1974 | Wright et al. .................. 242/128 |
| 4,111,380 | A | * | 9/1978 | Heuckroth ..................... 242/128 |
| 4,253,624 | A | | 3/1981 | Colbert |
| 5,465,917 | A | | 11/1995 | Kosch |
| 7,100,863 | B2 | * | 9/2006 | Hsu et al. ....................... 242/566 |
| 7,866,586 | B2 | * | 1/2011 | Fabian ........................... 242/171 |
| 8,127,923 | B2 | * | 3/2012 | Gelmetti ........................ 206/386 |

FOREIGN PATENT DOCUMENTS

| | | |
|---|---|---|
| DE | 202011108769 | 1/2012 |
| JP | 9-315686 | 12/1997 |
| JP | 2007-238323 | 9/2007 |
| KR | 100853530 | 8/2008 |

OTHER PUBLICATIONS

International Search Report in PCT/US2012/064813 dated Mar. 11, 2013.

* cited by examiner

*Primary Examiner* — William A Rivera
(74) *Attorney, Agent, or Firm* — Fildes & Outland, P.C.

(57) ABSTRACT

A dispenser for drum packed welding wire comprised of numerous coils includes a circular lid having an upper surface and a lower surface. The lower surface is floatingly positionable on top of the packed welding wire. A frame extends from the upper surface. The frame includes a hub and a radially extending support extending from the hub to the upper surface. The hub includes an aperture. The dispenser also includes a de-coil conduit having inlet and outlet ends for guiding welding wire therethrough. The inlet end and outlet end are generally at 90° to one another. The inlet end is disposed to receive welding wire in the drum parallel to the coils, and the inlet end is moveable relative to the circular lid as the wire is fed into the de-coil conduit. The outlet end directs the fed welding wire to the aperture in the hub.

20 Claims, 13 Drawing Sheets

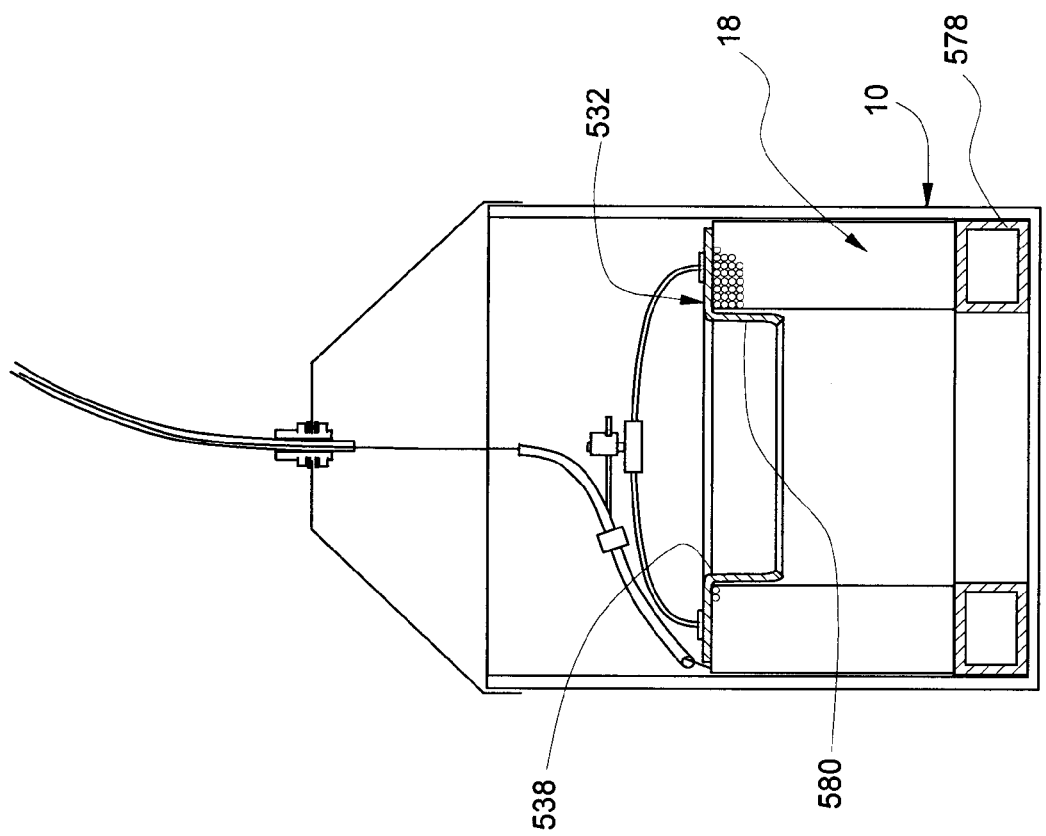

FLOATING DISPENSING MECHANISM FOR DRUM PACKED WELDING WIRE

TECHNICAL FIELD

This invention relates to welding, and more particularly to dispensing welding wire from bulk drum packages, where the wire is wrapped/coiled along the inner wall of the package.

BACKGROUND OF THE INVENTION

It is known in the art relating to welding that the welding wire (consumable electrode) used for welding applications, such as automated manufacturing processes, may be stored in bulk drum packages. Bulk drum packages of welding wire allow for prolonged, continuous dispensing of welding wire, and the package protects the welding wire from airborne contaminants that are present in the manufacturing environment.

During welding, such as with a GMAW (gas metal arc welding), MIG (metal inert gas) or similar welding torch, welding wire dispensed from the bulk drum package is loaded into a wire feeder which feeds the welding wire to the welding torch. If a dispensing failure occurs, such as if the welding wire becomes tangled inside the drum, the welding process must be halted until the failure is corrected by a human operator.

A typical cause of wire tangling in the bulk drum package, especially in the case of aluminum welding wire, is simultaneously de-coiling of more than one coil loop (i.e., lap) of wire. The loose laps expend by the inherent residual torque, and some laps may overlap each other and become tangled. When the wire laps are pulled from the central aperture, more than one lap may be pulled out simultaneously, and eventually tangle at the outlet port of the drum package.

A conventional solution to this tangling problem is to place a lid on top of the coiled welding wire in the package, so that the weight of the lid holds the coils and restricts the coils from prematurely lifting up during dispensing. The lid, however, is limited in its weight as the weight of the lid increases the pulling force required to dispense the wire. A heavy lid may cause the wire, especially aluminum wire, to bend when it is pulled out of the package. On the other hand, a lightweight lid may be lifted and tilted at its outer wedge when wire near the outer diameter of the package is pulled out. The lifting of the lid releases the holding force on the coiled wire underneath the lid and thus increases the chance of laps becoming loose and tangled.

More specifically, the welding wire is typically packed eccentrically so that adjacent layers (i.e., adjacent laps) have different circumferential positions such that the centers of the adjacent layers are offset from each other. Multiple layers of individual laps are built up in the package to form a column of welding wire having an outside diameter and an inside diameter defined by the eccentric, stacked layers of laps. Each individual lap of wire has point along its circumference that is close to the column outside diameter and a point that is close to the column inside diameter. During dispensing using a conventional lid, the wire forming the lap behaves differently along the lap. The basic structure of a conventional lid is a ring that covers the wire column. The wire is dispensed from an inside aperture of the lid, and pulled upwards to the drum outlet. The wire is held under the lid at the point that is close to the column outside diameter, while the wire is loosely held or not held at all at the point that is closed to the column inside diameter. Consequently, the pulling force on the wire is high when the wire is pulled at the outside diameter point and low when the wire is pulled at the inside diameter point. Thus, as the wire is dispensed and pulled from the outside diameter point of a lap, the upwards pulling force on the wire and the friction between the wire and the lid cause the lid to tilt and separate from the wire column. The loss of holding force due to the separation of the lid from the wire column can release an adjacent lap that has its circumference at the inside diameter of the wire column at the opposite, non-lifted side of the lid, because there is little to no holding force applied to this adjacent lap.

The pulling angle on the welding wire from the wire column to the outlet of the package is affected by the distance from the wire column to the package outlet. As this distance increases during dispensing (due to consumption of the wire from the top of the column down), the pulling forces increase to due an increase in the angle between the welding wire and the package outlet. Therefore, a low wire level in the package corresponds to a sharp pulling angle and thus an increased chance in the lid being lifted from the column. The change of lid lift also increases as the welding wire speed increases.

Because the container and packaged welding wire do not rotate during wire dispensing, the wire has a residual torque that needs to be released by twisting when it is dispensed. The clamping of the feeding rollers of the wire feeder and the friction inside the welding torch prevent the wire from twisting freely. The welding wire cannot twist until a certain amount of torque is built up. This built-up torque as well as the frictional force of an adjacent lap that is being pulled upwards for dispensing, causes a free lap (not being held by a lid as described above) to become loose within the package. The loose lap becomes smaller in diameter as the adjacent lap is pulled out of the package outlet. When the diameter of the loose lap decreases beyond a certain value and travels close enough to the package outlet, the loose lap of wire cannot normalize itself and becomes tangled, thereby causing the wire to jam at the package outlet. As stated above, this effect is more significant for aluminum wire because the wire is soft and the coefficient of friction of the wire is high.

There are also known methods of dispensing wire from a reel, where the wire is packed/coiled to the outside of a spool or reel. However, aluminum welding wire cannot be packed in an open reel due to its sensitivity to the environment.

SUMMARY OF THE INVENTION

The present invention provides a floating dispenser for drum packed welding wire or any welding wire stored in a container. The present floating dispenser restricts the welding wire from tangling during dispensing of the wire and provides a uniform dispensing force regardless of the height of the wire column within the container, thereby improving the wire feeding and arc stability of a welding system. The present floating dispenser pulls the welding wire in a direction that is generally parallel to the coil lap of wire (i.e., generally in plane with the circumference of the lap) such that little to no lifting force is applied to the wire lap being dispensed, and thus no lifting force is applied to an adjacent wire lap or the floating dispenser itself by the friction among the wire laps. The present floating dispenser therefore picks up the welding wire from the packaged wire coils along the top surface of wire coils rather than pulling the welding wire away from the wire coils.

More particularly, a dispenser for drum packed welding wire comprised of numerous coils includes a circular lid having an upper surface and a lower surface. The lower surface is floatingly positionable on top of the packed welding wire. A frame extends from the upper surface. The frame includes a hub and a radially extending support extending from the hub to the upper surface. The hub includes an aperture through which welding wire is pulled. The dispenser also includes a de-coil conduit having inlet and outlet ends for guiding welding wire therethrough. The inlet end and outlet end are generally at 90° to one another. The inlet end is disposed to receive welding wire in the drum parallel to the coils, and the inlet end is moveable relative to the circular lid as the wire is fed into the de-coil conduit. The outlet end directs the fed welding wire to the aperture in the hub.

The inlet end may be disposed in proximity to an inside diameter of the drum packed welding wire. The circular lid may have an aperture approximating an inside diameter of the drum packed welding wire. The circular lid may have a diameter approximating an outside diameter of the drum packed welding wire. The hub may be spaced from the circular lid. The hub may include a rotatable portion, and the de-coil conduit outlet end may be connected to the rotatable portion.

In another embodiment, a dispenser for drum packed welding wire is provided. The drum packed welding wire includes a container in which welding wire is packed into a plurality of coils forming a tubular column. The container has an outlet for the welding wire. The dispenser includes a circular lid having an upper surface and a lower surface. The lower surface is floatingly positionable in the container on top of the packed welding wire. A frame extends from the upper surface. The frame includes a hub and a radially extending support extending from the hub to the upper surface. An arm is pivotably connected to the hub. A de-coil conduit having inlet and outlet ends for guiding welding wire therethrough is mounted on the arm. The inlet end is disposed to receive welding wire in a direction that is parallel to the coils and tangential to a circumference of the coils.

The inlet end and outlet end of the de-coil conduit may be generally at 90° to one another, and the outlet end may direct the welding wire to the container outlet. The inlet end of the de-coil conduit may be disposed in proximity to an outside diameter of the tubular column of welding wire such that welding wire is fed into the inlet end from the outside diameter.

Optionally, the floating dispenser may include a plurality of floating pins cooperable with the circular lid and extending through apertures in the circular lid. The floating pins may be disposed within an inside diameter of the tubular column of welding wire such that the floating pins restrict inward movement of the coils. Alternatively, the floating dispenser may include a plurality of fixed legs extending from the lower surface of the circular lid. The fixed legs are disposed within an inside diameter of the tubular column of welding wire such that the fixed legs restrict inward movement of the coils. The dispenser of this embodiment is used in combination with a raised base inside the package, so that the fixed legs can fall into a hole in the raised base, while the dispenser lid can hold the wire to the very last lap. The raised base is disposed at the bottom of the container, the tubular column of welding wire is disposed on the raised base, and the fixed legs of the dispenser are receivable in the raised base. In another alternative, the floating dispenser may include a skirt extending from the lower surface of the circular lid. The skirt is disposed within an inside diameter of the tubular column of welding wire such that the skirt restricts inward movement of the coils. In this embodiment, the dispenser is also used in combination with a raised base disposed at the bottom of the container. The tubular column of welding wire is disposed on the raised base, and the skirt of the dispenser is receivable in the raised base.

An outer edge of the circular lid may have a curved, bowl shape. A plurality of wipers may be mounted on the circular lid. Each wiper may have a free end that extends to an inner surface of the container. Each wiper may be flexible in a direction parallel to the circular lid and generally rigid in a direction perpendicular to the circular lid such that the wipers restrict upward movement of the coils.

Alternatively, the inlet end of the de-coil conduit may be disposed in proximity to an inside diameter of the tubular column of welding wire such that welding wire is fed into the inlet end from the inside diameter. The de-coil conduit may be mounted on a distal end of the arm such the inlet and outlet ends of the de-coil conduit are parallel to the coils.

A method of dispensing drum packed welding wire comprised of a plurality of coils includes the steps of: providing a circular lid having an upper surface and a lower surface; floatingly positioning the lower surface on top of the packed welding wire; providing a frame extending from the upper surface, the frame including a hub and a radially extending support extending from the hub to the upper surface; operatively connecting a de-coil conduit to the hub, the de-coil conduit having inlet and outlet ends for guiding welding wire therethrough; and disposing the inlet end to receive welding wire in the drum parallel to the coils such that a pulling force is exerted on the welding wire at the inlet end in a direction generally parallel to the coils, and a lifting force is not exerted on the coils or the circular lid.

These and other features and advantages of the invention will be more fully understood from the following detailed description of the invention taken together with the accompanying drawings.

BRIEF DESCRIPTION OF THE DRAWINGS

In the drawings:

FIG. 13 is a side, sectional view of an alternative floating dispenser in accordance with the present invention.

DETAILED DESCRIPTION OF THE INVENTION

Figure 1:
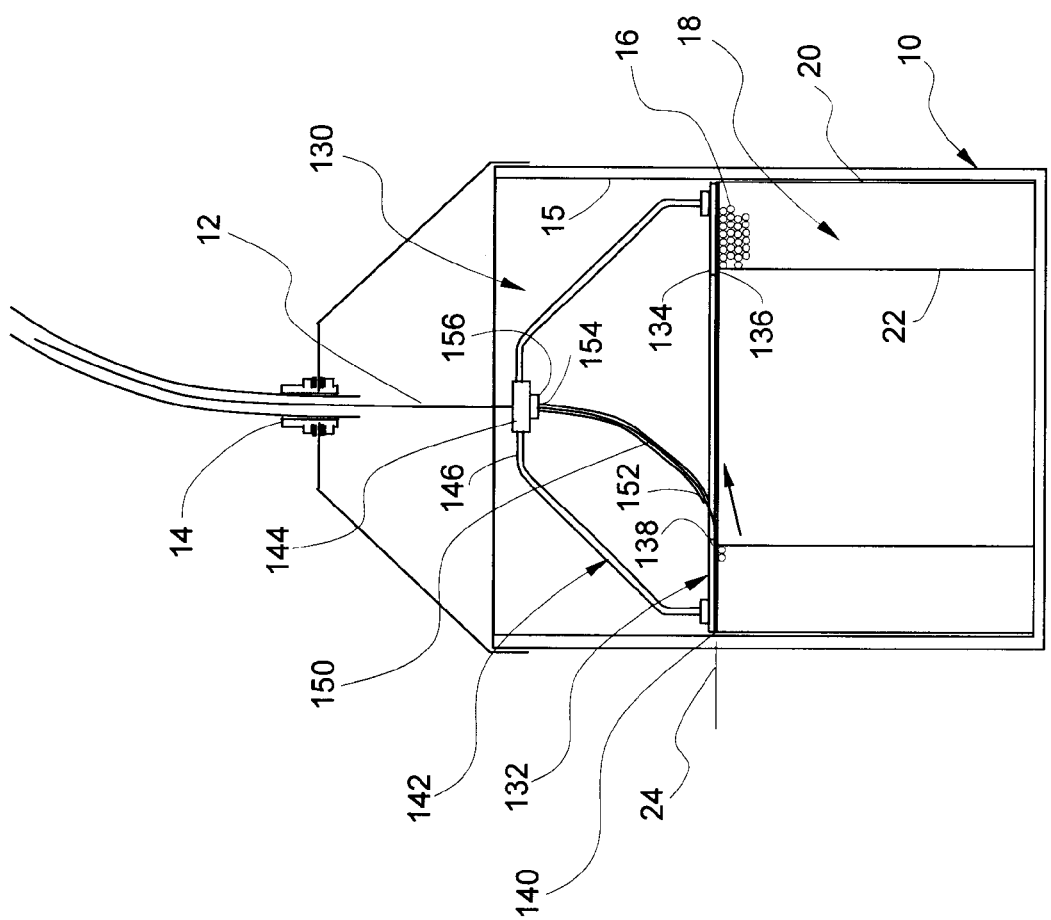
FIG. 1 is a side, sectional view of a floating dispenser in accordance with the present invention.

Referring now to the drawings in detail, numeral 10 generally indicates a container such as drum package or similar. The container 10 stores welding wire 12 such as aluminum welding wire, steel welding wire, or other suitable welding wire for consumption by a welding torch such as a GMAW (gas metal arc welding), MIG (metal inert gas), MAG (metal active gas), SAW (submerged arc welding), FCAW (flux cored arc welding) welding torch, or similar welding torch, and has an outlet 14 for leading the welding wire to a wire feeder of the welding torch. The welding wire 12 may be packed in the container 10 as a plurality of coil loops 16 (i.e, laps) in which adjacent laps are eccentrically disposed to form a tubular column 18 having an outside diameter 20 and an inside diameter 22. The tubular column 18 has a top surface 24 (in an upright orientation) that defines a wire level of the column in the container.

Figure 2:
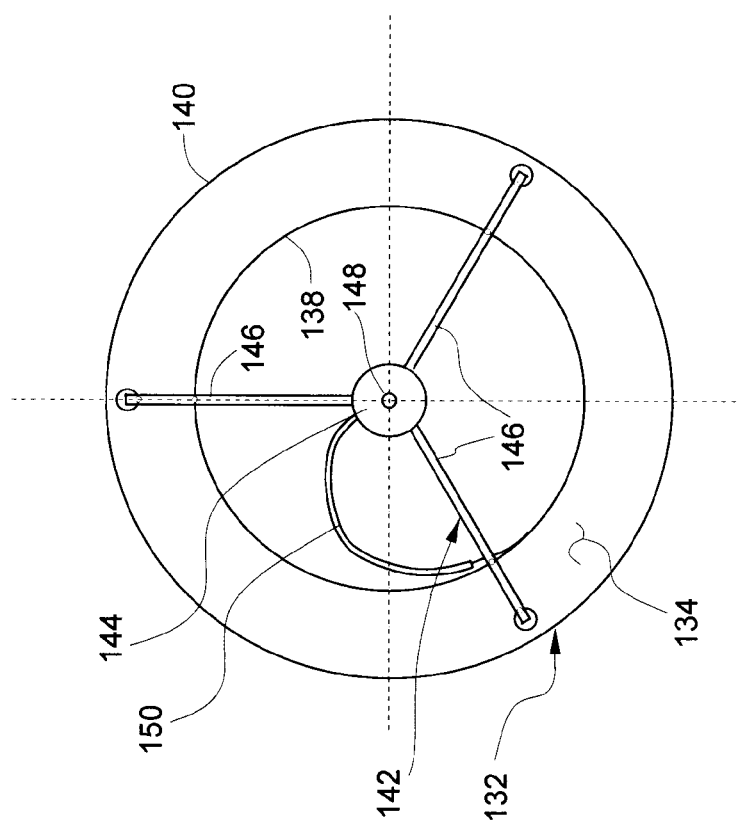
FIG. 2 is a plan view of the floating dispenser of FIG. 1.

Turning to FIGS. 1 and 2, a floating dispenser 130 in accordance with the present invention includes a circular lid 132 having an upper surface 134 (relative to the container outlet 14) and an opposite lower surface 136 (relative to a bottom of the container 10). The circular lid 132 may be generally disc-shaped and may include a central aperture 138 that has a diameter that is approximately equal to or less than the inside diameter 22 of the wire column 18. The circular lid 132 also has an outside diameter that is approximately equal to or slightly less than the outside diameter 20 of the wire column 18. Thus, the annular outer edge 140 of the circular lid 132 may generally coincide with the outside diameter 20 of the wire column 18 and an inner wall surface 15 of the container 10, or a gap may exist between the outer edge of the circular lid and the outside diameter of the wire column. The lower surface 136 of the circular lid 132 is disposable in the container 10 and floatingly positionable on the top 24 of the tubular column 18 of packed welding wire 12.

A frame 142 extends from the upper surface 134 of the circular lid 132. The frame 142 includes a hub 144 generally concentric with and spaced from the circular lid 132 and one or more radially extending supports 146 that extend from the hub to the upper surface 134 of the circular lid 132. The hub 144 may include an aperture 148 through which welding wire is pulled.

The floating dispenser 130 further includes a de-coil conduit 150 having an inlet end 152 and an outlet end 154 for guiding the welding wire 12 through the de-coil conduit. The inlet and outlet ends 152, 154 of the de-coil conduit 150 may be generally at 90° to one another. The inlet end 152 is disposed in proximity to the inside diameter 22 of the wire column 18, and the inlet end 152 is disposed to receive the welding wire 12 generally parallel to the wire coils 16 at the top surface 24 of the wire column (i.e., generally in plane with the circumference of the lap being fed into the de-coil conduit 150 and in plane with the diameter of the wire column, thus transverse to an axial direction of the wire column) so that the "pulling" force on the welding wire is applied at an angle of approximately 0° relative to the top surface of the wire column. In this embodiment, the inlet end 152 is disposed in proximity to the inside diameter 22 of the wire column 18 such that de-coil conduit 150 picks up welding wire from the inside diameter of the wire column. The outlet end 154 directs the fed welding wire 12 to the aperture 148 in the hub 144. The outlet end 154 may be connected to the hub 144. If the de-coil conduit 150 is made of a rigid material, then the hub may include a rotatable portion 156 that allows the de-coil conduit inlet end 152 to move along the inside diameter 22 of the wire column 18. The rotatable portion 156 may be freely rotatable or may include a brake mechanism. Alternatively, if the de-coil conduit 150 is made of a flexible material such spring coils, then the hub need not include a rotatable portion. The de-coil conduit 150 may also be partially flexible and partially rigid, and may be a single tube or multiple layers of tube.

During a welding operation, as the wire feeder of the welding torch pulls welding wire 12 from the container 10, the inlet end 152 of the de-coil conduit 150 rotates about the top 24 of the wire column 18 to pick up the welding wire in a direction generally parallel to the top of the wire column (shown schematically in the drawings). The welding wire 12 travels through the de-coil conduit 150 from the inlet end 152 to the outlet end 154, causing the wire to turn approximately 90° from a radial direction of the wire column 18 to an axial direction of the wire column such that the wire at the outlet end of the de-coil conduit is generally aligned with the container outlet 14. The welding wire 12 passes through the aperture 148 of the hub 144 and then travels to the container outlet 14 where it is guided to the wire feeder. As the welding wire 12 is continuously dispensed from the container 10, the wire level in the container decreases (e.g., assuming the container is in an upright position, the top 24 of the wire column 18 drops towards the bottom of the container away from the outlet 14) and the position of the floating dispenser 130 simultaneously drops as the circular lid 132 remains on top of the wire column. Due to the construction of the floating dispenser 130, the inlet end 152 of the de-coil conduit 150 is moveable with the circular lid 132 as the circular lid moves with the top 24 of the wire column, thereby maintaining the inlet end in a parallel disposition relative to the wire coils 16.

Figure 3:
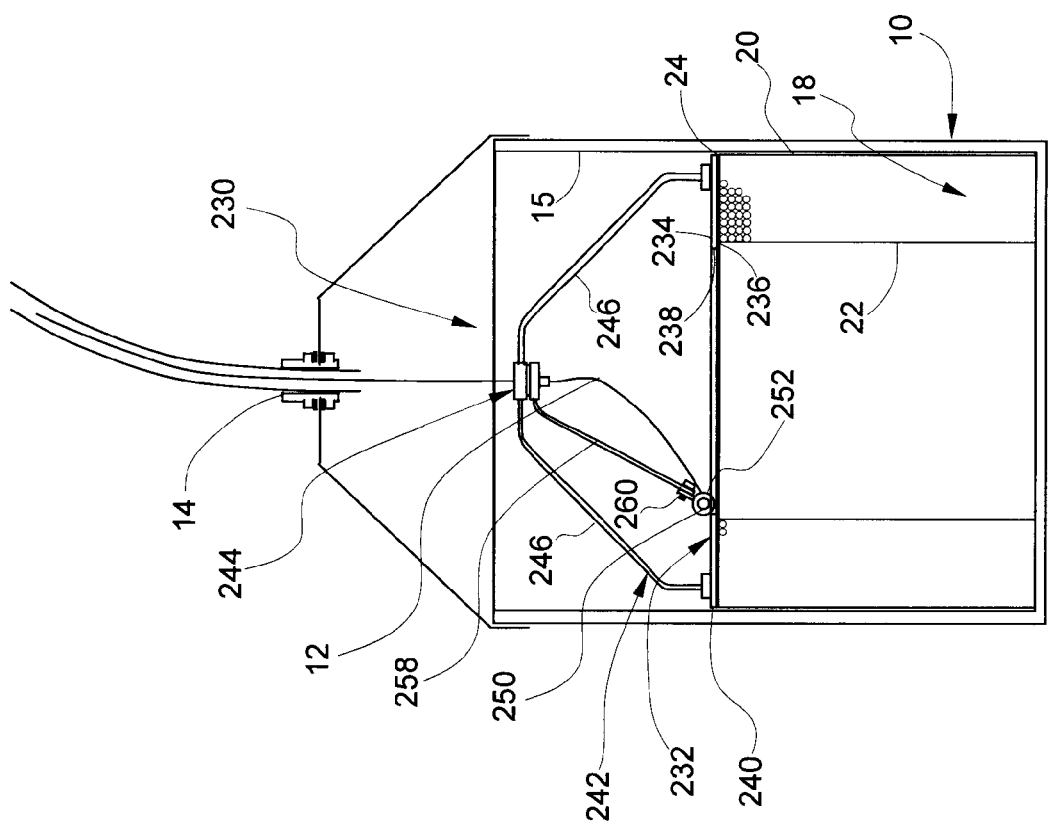
FIG. 3 is a side, sectional view of an alternative floating dispenser in accordance with the present invention.
Figure 4:
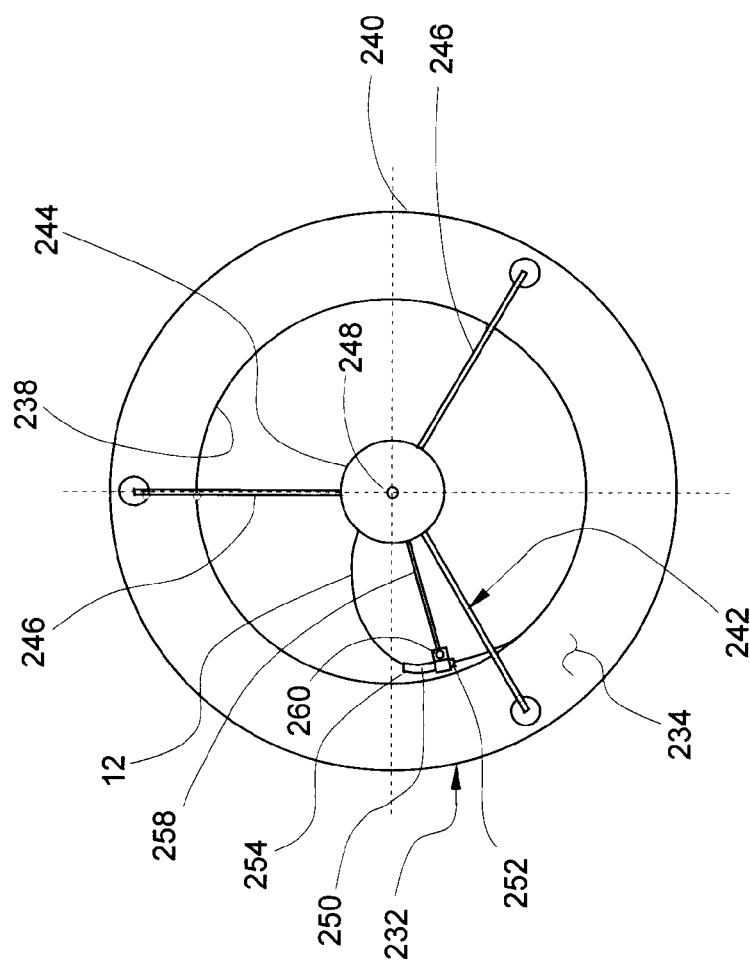
FIG. 4 is a plan view of the floating dispenser of FIG. 3.

With reference to FIGS. 3 and 4, in another embodiment a floating dispenser 230 in accordance with the present invention includes a circular lid 232 having an upper surface 234 (relative to the container outlet 14) and an opposite lower surface 236 (relative to a bottom of the container 10). The circular lid 232 may be generally disc-shaped and may include a central aperture 238 that has a diameter that is approximately equal to or less than the inside diameter 22 of the wire column 18. The circular lid 232 also has an outside diameter that is approximately equal to or slightly less than the outside diameter 20 of the wire column 18. Thus, the annular outer edge 240 of the circular lid 232 may generally coincide with the outside diameter 20 of the wire column 18 and an inner wall surface 15 of the container 10. The lower surface 236 of the circular lid 232 is disposable in the container 10 and floatingly positionable on the top 24 of the tubular column 18 of packed welding wire 12.

A frame 242 extends from the upper surface 234 of the circular lid 232. The frame 242 includes a hub 244 generally concentric with and spaced from the circular lid 232 and one or more radially extending supports 246 that extend from the hub to the upper surface 234 of the circular lid 232. The hub 244 includes an aperture 248 through which welding wire is pulled. An arm 258 is pivotably connected to the hub 244 and also extends generally in a radial direction from the hub towards the circular lid 232. In this embodiment, the arm 258 extends towards the inside diameter 22 of the wire column 18 such that a distal, free end 260 of the arm opposite the pivotal connection of the arm to the hub is disposed in the vicinity of the inside diameter of the wire column. Therefore, the arm 258 is generally disposed between the frame supports 246 and the upper surface 234 of the circular lid 232.

A de-coil conduit 250 having inlet and outlet ends 252, 254, respectively, is mounted on the distal end 260 of the arm 258 such that the inlet and outlet ends of the de-coil conduit are generally parallel to the wire coils 16. Thus, the inlet end 252 of the de-coil conduit 250 is disposed to receive welding wire 12 in a direction that is generally parallel to the wire coils 16 at the top surface 24 of the wire column 18 (i.e., generally in plane with the circumference of the lap being fed into the de-coil conduit 250 and in plane with the diameter of the wire column, thus transverse to an axial direction of the wire column) and tangential to a circumference of the coils. In this embodiment, the inlet end 252 is disposed in proximity to the inside diameter 22 of the wire column 18 such that welding wire 12 is fed into the inlet end from the inside diameter 22 of the wire column 18. The fed welding wire 12 exits the outlet end 254 of the de-coil conduit 250 and travels freely to the aperture 248 in the hub 244.

During a welding operation, as the wire feeder of the welding torch pulls welding wire 12 from the container 10, the arm 258 and attached de-coil conduit 250 rotate about the top 24 of the wire column 18 along the inside diameter 22, and the inlet end 252 of the de-coil conduit picks up the welding wire in a direction generally parallel to the top of the wire column (shown schematically in the drawings). The welding wire 12 travels through the de-coil conduit 250 from the inlet end 252 to the outlet end 254, exits the outlet end 254 and travels freely in space to the hub 244. The welding wire 12 passes through the aperture 248 of the hub 244 such that the welding wire is generally aligned with the container outlet 14. The welding wire 12 then travels to the container outlet 14 where it is guided to the wire feeder. As the welding wire 12 is continuously dispensed from the container 10, the wire level in the container decreases (e.g., assuming the container is in an upright position, the top surface 24 of the wire column 18 drops towards the bottom of the container away from the outlet 14) and the position of the floating dispenser 230 simultaneously drops as the circular lid 232 remains on top of the wire column. Due to the construction of the floating dispenser 230, the de-coil conduit 250 is moveable with the circular lid 232 as the circular lid moves with the top 24 of the wire column, thereby maintaining the inlet end 252 of the de-coil conduit in a parallel disposition relative to the wire coils 16.

Figure 5:
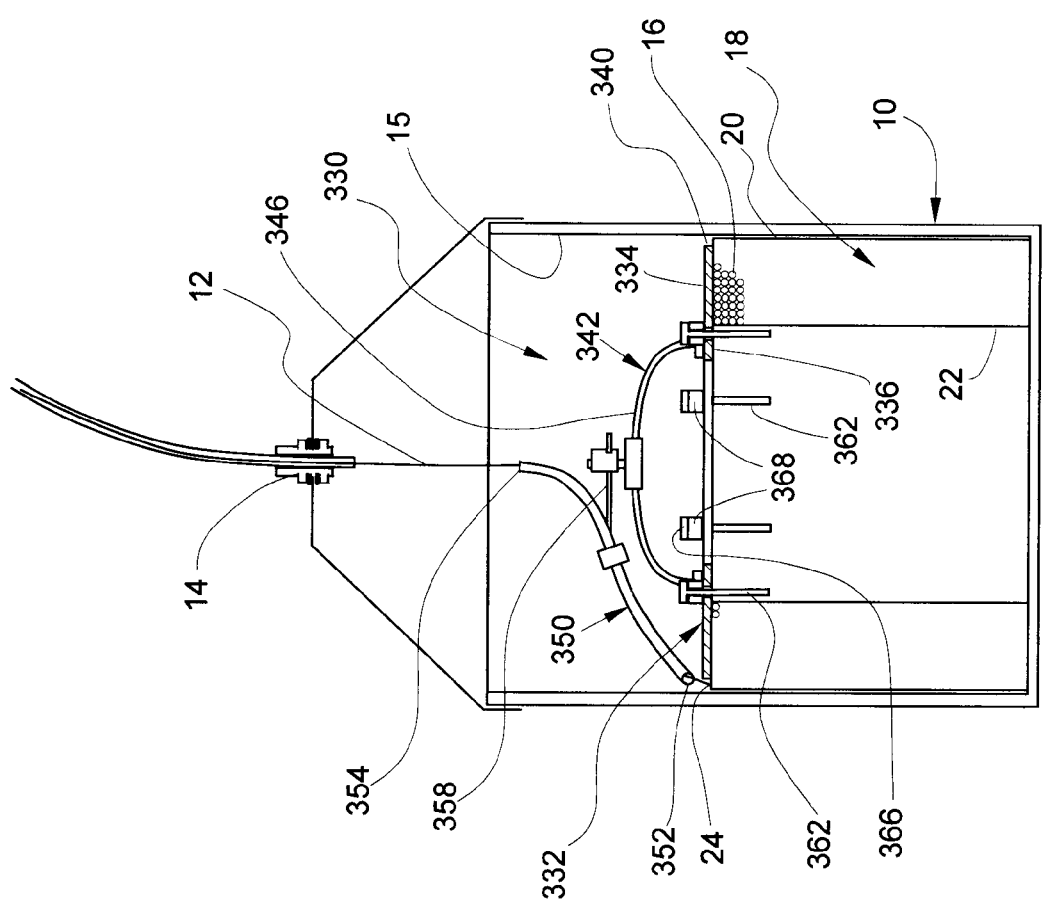
FIG. 5 is a side, sectional view of an alternative floating dispenser in accordance with the present invention.
Figure 6:
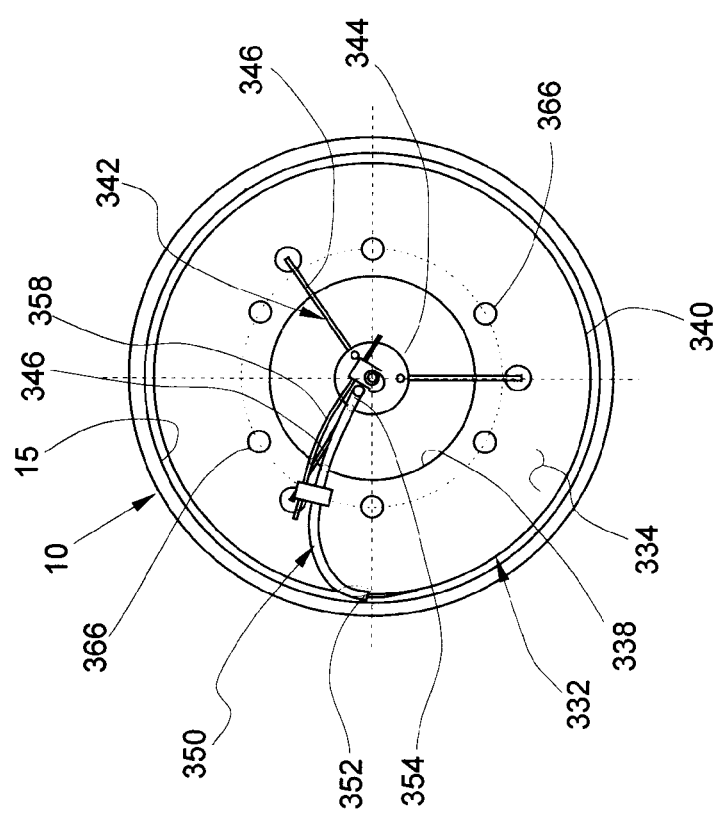
FIG. 6 is a plan view of the floating dispenser of FIG. 5.
Figure 7:
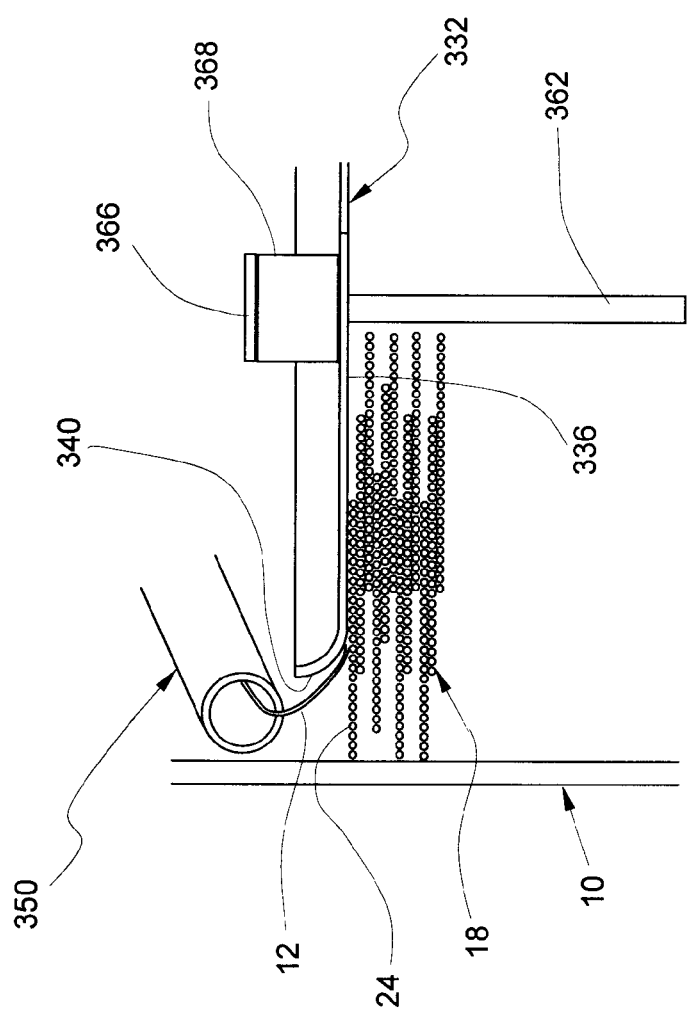
FIG. 7 is an enlarged view of a portion of a floating dispenser in accordance with the present invention.
Figure 8:
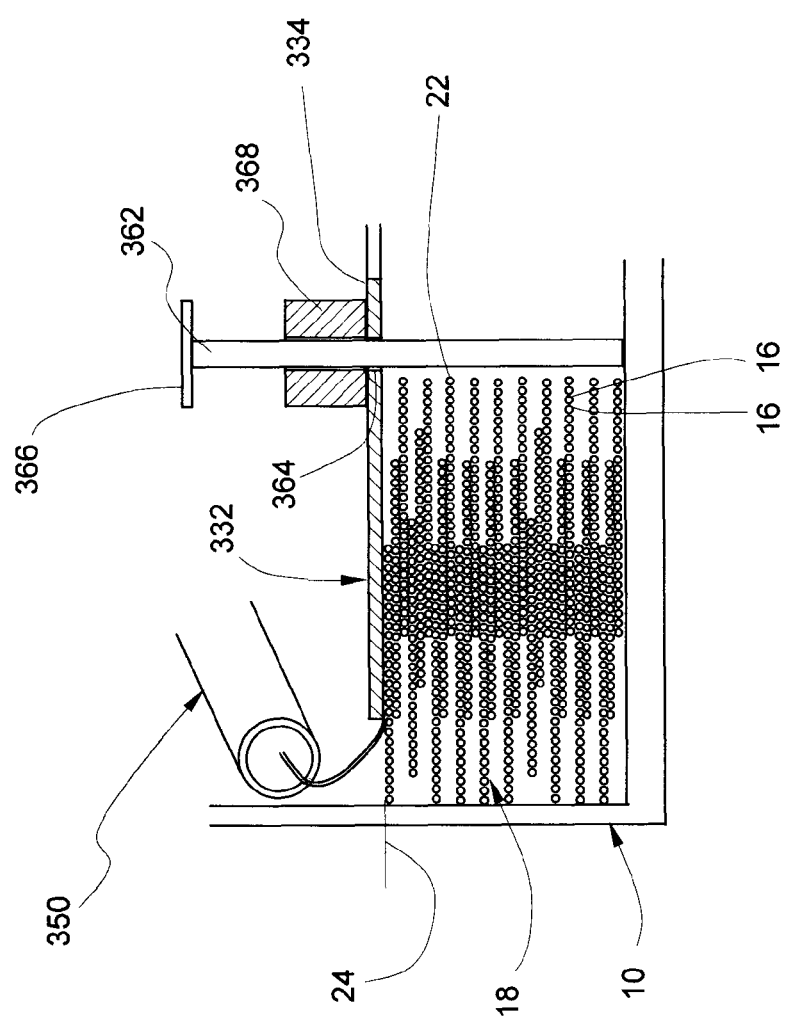
FIG. 8 is an enlarged view of a portion of the floating dispenser of FIG. 5.

With reference to FIGS. 5 and 6, in yet another embodiment a floating dispenser 330 in accordance with the present invention includes a circular lid 332 having an upper surface 334 (relative to the container outlet 14) and an opposite lower surface 336 (relative to a bottom of the container 10). The circular lid 332 may be generally disc-shaped and may include a central aperture 338 that has a diameter that is approximately equal to or less than the inside diameter 22 of the wire column 18. The circular lid 332 also has an outside diameter that is slightly less than the outside diameter 20 of the wire column 18. Thus, the annular outer edge 340 of the circular lid 332 is spaced from the outside diameter 20 of the wire column 18 and an inner wall surface 15 of the container 10 such that a gap exists between the outer edge of the circular lid and the outside diameter of the wire column. The outer edge 340 of the circular lid 332 may have a curved, bowl shape as shown in FIG. 7 to prevent the welding wire 12 from rubbing against a sharp edge when it is dispensed. The lower surface 336 of the circular lid 332 is disposable in the container 10 and floatingly positionable on the top 24 of the tubular column 18 of packed welding wire 12.

A frame 342 extends from the upper surface 334 of the circular lid 332. The frame 342 includes a hub 344 generally concentric with and spaced from the circular lid 332 and one or more radially extending supports 346 that extend from the hub to the upper surface 334 of the circular lid 332. An arm 358 is pivotably connected to the hub 344 and also extends outwardly away from the hub. In this embodiment, the arm 358 is disposed above the hub 344 and the frame supports 346.

A de-coil conduit 350 having inlet and outlet ends 352, 354, respectively, is mounted on the arm 358 such that the inlet and outlet ends of the de-coil conduit are generally at 90° to one another. The inlet end 352 is disposed in proximity to the outside diameter 20 of the wire column 18, and the inlet end 352 is disposed to receive the welding wire 12 from the outside diameter in a disposition that is generally parallel to the wire coils 16 at the top surface 24 of the wire column and tangential to a circumference of the wire coils (i.e., generally in plane with the circumference of the lap being fed into the de-coil conduit 350 and in plane with the diameter of the wire column, thus transverse to an axial direction of the wire column). The outlet end 354 of the de-coil conduit 350 directs the fed welding wire 12 to the container outlet 14.

As shown in FIGS. 5 through 8, a plurality of floating pins 362 are cooperable with the circular lid 332. Each floating pin 362 extends through an aperture 364 (FIG. 8) in the circular lid 332 that has a diameter slightly greater than the diameter of the floating pin. Each floating pin 362 includes a larger diameter head 366 that, together with a retainer 368 mounted on the upper surface 334 of the circular lid 332 limits downward movement of the floating pin. The floating pins 362 are disposed within the inside diameter 22 of the wire column 18 such that the floating pins restrict inward movement of the wire coils 16 comprising the wire column. As the wire level (height of the top 24 of the wire column 18) decreases below a certain value, the floating pins 362 contact the bottom of the container 10 and move upwardly through the apertures 364 (and the head 366 moves away from the retainer 368) to allow that circular lid 332 to maintain contact with the top 24 of the wire column 18 as the remaining welding wire 12 is dispensed.

Figure 9:
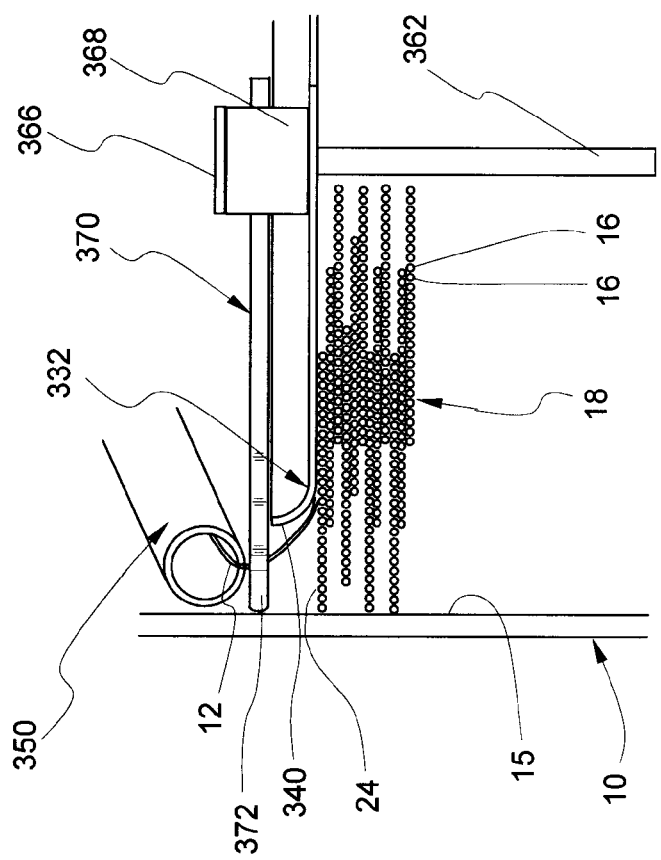
FIG. 9 is an enlarged view of a floating dispenser in accordance with the present invention.
Figure 10:
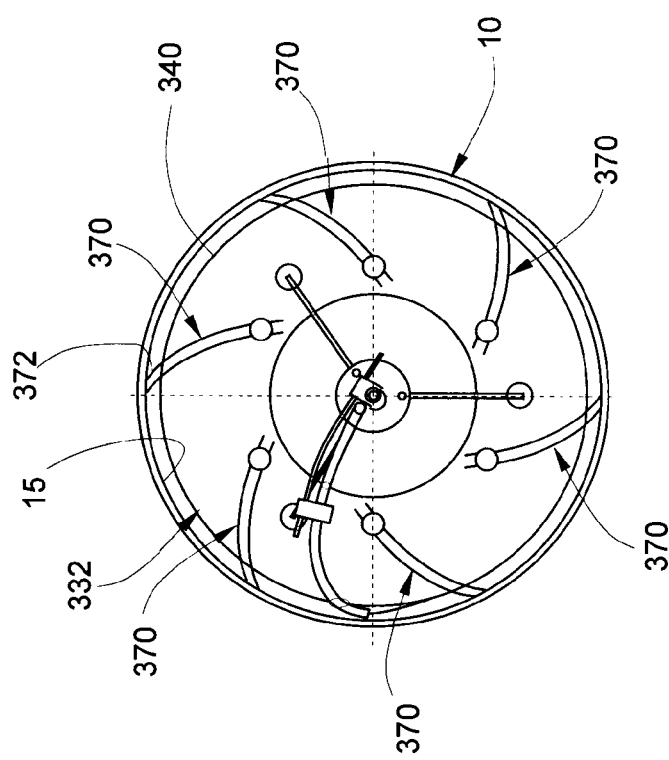
FIG. 10 is a plan view of the floating dispenser of FIG. 9.
Figure 11:
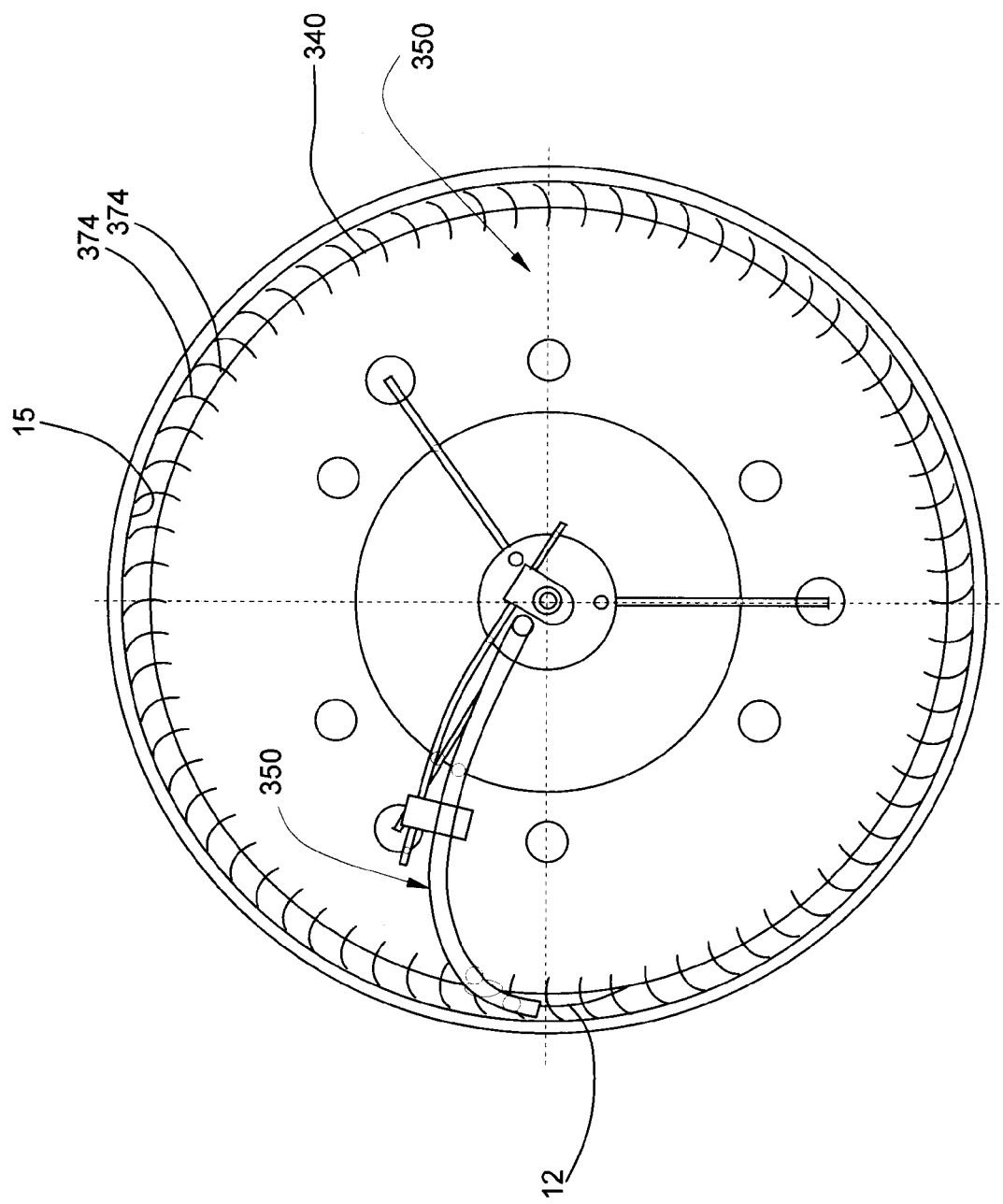
FIG. 11 is a plan view of a floating dispenser in accordance with the present invention.

As shown in FIGS. 9 and 10, a plurality of wipers 370 optionally may be mounted on the circular lid 332. Each wiper 370 has a free end 372 that extends outwardly beyond the outer edge 340 of the circular lid 332 to an inner wall surface 15 of the container 10. Each wiper 370 is flexible in a direction parallel to the circular lid 332 (e.g., a horizontal direction if the container 10 is in an upright position) to allow welding wire 12 that is being fed into the de-coil conduit to pass by in the circumferential direction of the wire column 18. Each wiper 370 is also generally rigid in a direction perpendicular to the circular lid 332 (e.g., a vertical direction if the container 10 is in an upright position) so that the wipers restrict upward movement of the wire coils 16 to limit individual wire laps at or near the top surface 24 of the wire column 18 from lifting up. As shown in FIG. 11, alternatively, a greater number of flexible wipers 374 may be disposed at short intervals around the entire outer edge 340 of the circular lid 332. One end of each wiper 374 is mounted on the circular lid 332 and the opposite free end of each wiper contacts the container inner wall surface 15. Welding wire 12 can easily pass by each wiper 374 as it is picked up by the de-coil conduit 350, but a lap of wire or any portion of a lap of wire cannot lift up vertically past the wipers.

During a welding operation, as the wire feeder of the welding torch pulls welding wire 12 from the container 10, the arm 358 and mounted de-coil conduit 350 rotate about the top 24 of the wire column 18 along the outside diameter 22, and the inlet end 352 of the de-coil conduit picks up the welding wire in a direction generally parallel to the top of the wire column (shown schematically in the drawings). The welding wire 12 travels through the de-coil conduit 350 from the inlet end 352 to the outlet end 354 where it is generally aligned with the container outlet 14. The welding wire 12 exits the outlet end 354 and travels freely in space to the container outlet 14 where it is guided to the wire feeder. As the welding wire 12 is continuously dispensed from the container 10, the wire level in the container decreases (e.g., assuming the container is in an upright position, the top 24 of the wire column 18 drops towards the bottom of the container away from the outlet 14) and the position of the floating dispenser 330 simultaneously drops as the circular lid 332 remains on top of the wire column. Due to the construction of the floating dispenser 330, the de-coil conduit 350 is moveable with the circular lid 332 as the circular lid moves with the top 24 of the wire column, thereby maintaining the inlet end 352 of the de-coil conduit in a parallel disposition relative to the wire coils 16.

Figure 12:
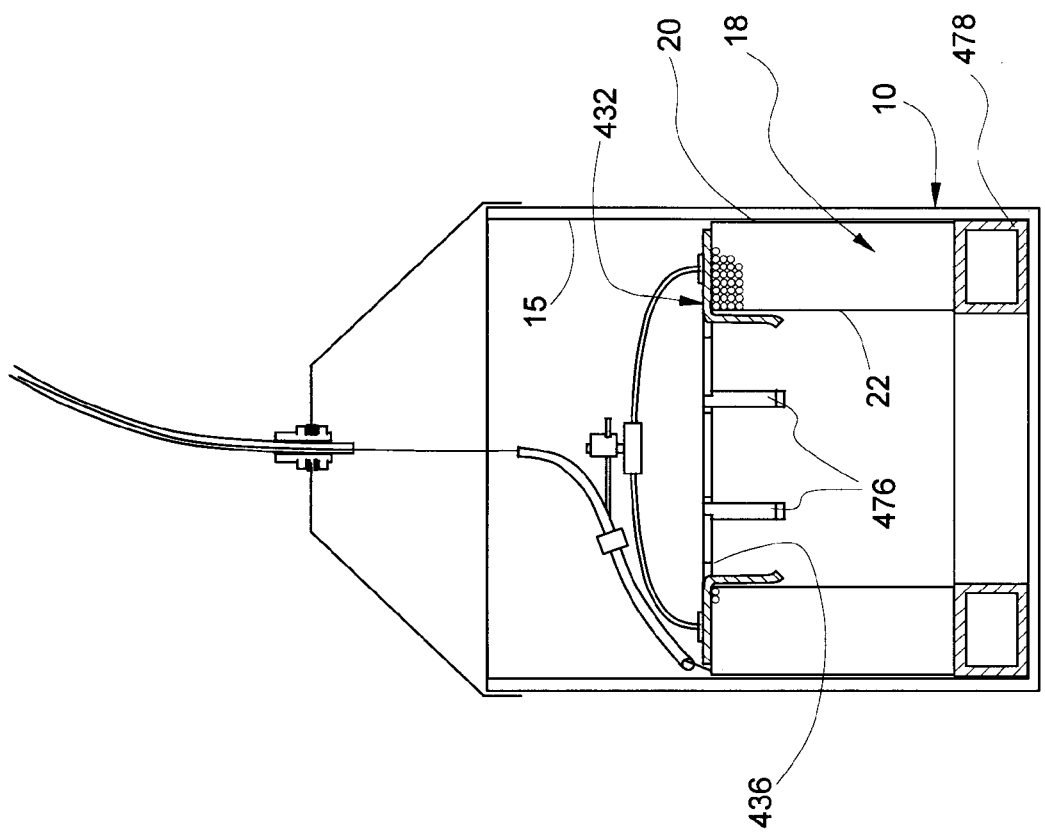
FIG. 12 is a side, sectional view of an alternative floating dispenser in accordance with the present invention.

Turning to FIG. 12, a plurality of fixed legs 476 may be substituted for the floating pins. The fixed legs 476 are attached to the lower surface 436 of the circular lid 432 and extend downwardly therefrom. In this embodiment, a raised base 478 is disposed at the bottom of the container 10 along the circumference of the inner wall surface 15. The base 478 has a width that is at least equal to the distance between the outside diameter 20 and inside diameter 22 of the wire column 18 so that the base provides a raised support for the wire column. The height of the base 478 is equal to or greater than the length of the legs 476, so that the circular lid 432 maintains contact with the wire column 18 until the wire is completely dispensed from underneath the circular lid. The legs 476 provide the same function as the floating pins, which is to prevent the wire coils of the wire column from collapsing inwardly as the wire is dispensed from the container.

As shown in FIG. 13, the legs optionally may be replaced with a fixed skirt 580 that extends downwardly from the edge of the central aperture 538 of the circular lid 532. A raised base 578 is also disposed at the bottom of the container 10, and the skirt 580 has a height that is equal to or less than the height of the base, so that the circular lid 532 maintains contact with the wire column 18 until the wire is completely dispensed from underneath the circular lid. The skirt 580 provides the same function as the floating pins and the fixed legs, which is to prevent the wire coils of the wire column from collapsing inwardly as the wire is dispensed from the container.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A dispenser for drum packed welding wire comprised of numerous coils, the dispenser comprising:
   a circular lid having an upper surface and a lower surface;
   said lower surface floatingly positionable on top of the packed welding wire;
   a frame extending from said upper surface;
   said frame including a hub and a radially extending support extending from said hub to said upper surface;
   said hub including an aperture through which welding wire is pulled;
   a de-coil conduit having inlet and outlet ends for guiding welding wire therethrough;
   said inlet end and outlet end being generally at 90° to one another;
   said inlet end being disposed to receive welding wire in said drum parallel to said coils;
   said inlet end being moveable relative to said circular lid as the wire is fed into said de-coil conduit;
   said outlet end directing the fed welding wire to said aperture in said hub.

2. The dispenser of claim 1, wherein said inlet end is disposed in proximity to an inside diameter of the drum packed welding wire.

3. The dispenser of claim 1, wherein said circular lid has an aperture approximating an inside diameter of the drum packed welding wire.

4. The dispenser of claim 1, wherein said circular lid has a diameter approximating an outside diameter of the drum packed welding wire.

5. The dispenser of claim 1, wherein said hub is spaced from said circular lid.

6. The dispenser of claim 1, wherein said hub includes a rotatable portion, and said de-coil conduit outlet end is connected to said rotatable portion.

7. A dispenser for drum packed welding wire, the drum packed welding wire including a container in which welding wire is packed into a plurality of coils forming a tubular column, the container having an outlet for the welding wire, the dispenser comprising:
   a circular lid having an upper surface and a lower surface;
   said lower surface floatingly positionable in said container on top of the packed welding wire;
   a frame extending from said upper surface;
   said frame including a hub and a radially extending support extending from said hub to said upper surface;
   an arm pivotably connected to said hub;
   a de-coil conduit having inlet and outlet ends for guiding welding wire therethrough, said de-coil conduit being mounted on said arm;
   said inlet end being disposed to receive welding wire in a direction that is parallel to said coils and tangential to a circumference of said coils.

8. The dispenser of claim 7, wherein said inlet end and outlet end of said de-coil conduit are generally at 90° to one another, and said outlet end directs said welding wire to said container outlet.

9. The dispenser of claim 7, wherein said inlet end of said de-coil conduit is disposed in proximity to an outside diameter of the tubular column of welding wire such that welding wire is fed into said inlet end from said outside diameter.

10. The dispenser of claim 9, including a plurality of floating pins cooperable with said circular lid and extending through apertures in said circular lid, said floating pins being disposed within an inside diameter of the tubular column of welding wire such that said floating pins restrict inward movement of said coils.

11. The dispenser of claim 9, including a plurality of fixed legs extending from the lower surface of said circular lid, said fixed legs being disposed within an inside diameter of the tubular column of welding wire such that said fixed legs restrict inward movement of said coils.

12. The dispenser of claim 11 in combination with a raised base disposed at the bottom of the container, the tubular column of welding wire being disposed on the raised base, and said fixed legs of said dispenser being receivable in the raised base.

13. The dispenser of claim 9, including a skirt extending from the lower surface of said circular lid, said skirt being disposed within an inside diameter of the tubular column of welding wire such that said skirt restricts inward movement of said coils.

14. The dispenser of claim 13 in combination with a raised base disposed at the bottom of the container, the tubular column of welding wire being disposed on the raised base, and said skirt of said dispenser being receivable in the raised base.

15. The dispenser of claim 9, wherein an outer edge of said circular lid has a curved, bowl shape.

16. The dispenser of claim 9, including a plurality of wipers mounted on said circular lid, each wiper having a free end that extends to an inner surface of said container.

17. The dispenser of claim 16, wherein each wiper is flexible in a direction parallel to said circular lid and generally rigid in a direction perpendicular to said circular lid such that said wipers restrict upward movement of said coils.

18. The dispenser of claim 7, wherein said inlet end is disposed in proximity to an inside diameter of the tubular column of welding wire such that welding wire is fed into said inlet end from said inside diameter.

19. The dispenser of claim 18, wherein said de-coil conduit is mounted on a distal end of said arm such the inlet and outlet ends of said de-coil conduit are parallel to said coils.

20. A method of dispensing drum packed welding wire comprised of a plurality of coils, the method comprising:
- providing a circular lid having an upper surface and a lower surface;
- floatingly positioning said lower surface on top of the packed welding wire;
- providing a frame extending from said upper surface, said frame including a hub and a radially extending support extending from said hub to said upper surface;
- operatively connecting a de-coil conduit to said hub, said de-coil conduit having inlet and outlet ends for guiding welding wire therethrough;
- disposing said inlet end to receive welding wire in said drum parallel to said coils such that a pulling force is exerted on said welding wire at said inlet end in a direction generally parallel to said coils, and a lifting force is not exerted on said coils or said circular lid.

* * * * *